United States Patent
Thorner et al.

(10) Patent No.: US 11,784,505 B2
(45) Date of Patent: Oct. 10, 2023

(54) METHOD FOR PULSE CHARGING IN VOLTAGE CONTROL MODE WITH STEPS OF VARIABLE AMPLITUDE

(71) Applicants: PSA AUTOMOBILES SA, Poissy (FR); INSTITUT POLYTECHNIQUE DE GRENOBLE, Grenoble (FR); SAFT, Levallois Perret (FR)

(72) Inventors: Gentien Thorner, Paris (FR); Francis Roy, Les Ulis (FR); Jean Bernard Douet, Bazainville (FR); Thomas Peuchant, Le Bouscat (FR); David Herpe, Tresses (FR); Pierre Xavier Thivel, Grenoble (FR); Jean Claude Leprêtre, Voreppe (FR)

(73) Assignees: PSA AUTOMOBILES SA, Poissy (FR); INSTITUT POLYTECHNIQUE DE GRENOBLE, Grenoble (FR); SAFT, Levallois (FR)

( * ) Notice: Subject to any disclaimer, the term of this patent is extended or adjusted under 35 U.S.C. 154(b) by 0 days.

(21) Appl. No.: 17/796,469

(22) PCT Filed: Jan. 11, 2021

(86) PCT No.: PCT/FR2021/050036
§ 371 (c)(1),
(2) Date: Jul. 29, 2022

(87) PCT Pub. No.: WO2021/156553
PCT Pub. Date: Aug. 12, 2021

(65) Prior Publication Data
US 2023/0208174 A1    Jun. 29, 2023

(30) Foreign Application Priority Data
Feb. 6, 2020 (FR) .................................. 2001164

(51) Int. Cl.
*H02J 7/00* (2006.01)
(52) U.S. Cl.
CPC .................. *H02J 7/00711* (2020.01)
(58) Field of Classification Search
None
See application file for complete search history.

(56) References Cited

U.S. PATENT DOCUMENTS

| | | | |
|---|---|---|---|
| 6,229,285 B1 * | 5/2001 | Ding | H02J 7/00711 320/132 |
| 6,232,750 B1 * | 5/2001 | Podrazhansky | H02J 7/00711 320/139 |

(Continued)

FOREIGN PATENT DOCUMENTS

| | | |
|---|---|---|
| EP | 1396061 A2 | 3/2004 |
| EP | 2146415 A1 | 1/2010 |
| WO | 2019111226 A1 | 6/2019 |

OTHER PUBLICATIONS

International Search Report for PCT/FR2021/050036 dated Apr. 21, 2021.
Written Opinion for PCT/FR2021/050036 dated Apr. 21, 2021.

Primary Examiner — Samuel Berhanu
(74) Attorney, Agent, or Firm — Sandberg Phoenix & von Gontard PC (57) ABSTRACT

The present invention relates to a method for charging an electrochemical cell of a rechargeable battery with charging pulse control (PL), the pulses (PL) being driven in voltage control mode in the form of voltage steps (Pt) of variable amplitude. According to the invention, the method consists in calculating the value (Ut+1) of each voltage step (Pt+1) with respect to the value (Ut) of the preceding voltage step (Pt) and according to a progression variable representative of the variation in the internal resistance of the cell (d(R)/dt), for a period ending on the preceding step (Pt), with respect (Continued)

to a predetermined tolerated variation threshold (α), where Var=d(R)/dt−α. The method applies to high-voltage electric battery charging protocols for electromobility or stationary applications, or portable device batteries, for example.

18 Claims, 7 Drawing Sheets

(56) References Cited

U.S. PATENT DOCUMENTS

| | | | |
|---|---|---|---|
| 6,707,272 B1 | 3/2004 | Thandiwe | |
| 2004/0032237 A1* | 2/2004 | Dykeman | H02J 7/00711 |
| | | | 320/141 |
| 2004/0256995 A1* | 12/2004 | Takeuchi | H01J 1/312 |
| | | | 315/169.1 |
| 2007/0170890 A1* | 7/2007 | Fee | H02J 7/00711 |
| | | | 320/128 |
| 2010/0066309 A1* | 3/2010 | Labrunie | H01M 10/4264 |
| | | | 320/141 |
| 2010/0072951 A1* | 3/2010 | Nakashima | H02J 7/00711 |
| | | | 320/145 |
| 2010/0219795 A1* | 9/2010 | Morimoto | H02J 7/007182 |
| | | | 320/145 |
| 2014/0266068 A1 | 9/2014 | O'Brien et al. | |
| 2015/0028819 A1 | 1/2015 | Yau et al. | |
| 2016/0322841 A1 | 11/2016 | Reisz et al. | |
| 2017/0005497 A1 | 1/2017 | Sherstyuk et al. | |

\* cited by examiner

METHOD FOR PULSE CHARGING IN VOLTAGE CONTROL MODE WITH STEPS OF VARIABLE AMPLITUDE

CROSS-REFERENCE TO RELATED APPLICATIONS

This application is the US National Stage under 35 USC § of International Application No. PCT/FR2021/050036, filed Nov. 1, 2021 which claims the priority of French application No. 2001164 filed on Feb. 6, 2020, the content (text, drawings and claims) of both said applications being incorporated herein by way of reference.

BACKGROUND

The field of the invention relates to a method for rapid charging of an electrochemical cell of a rechargeable battery, and in particular to a method with voltage pulse control.

Figure 1:
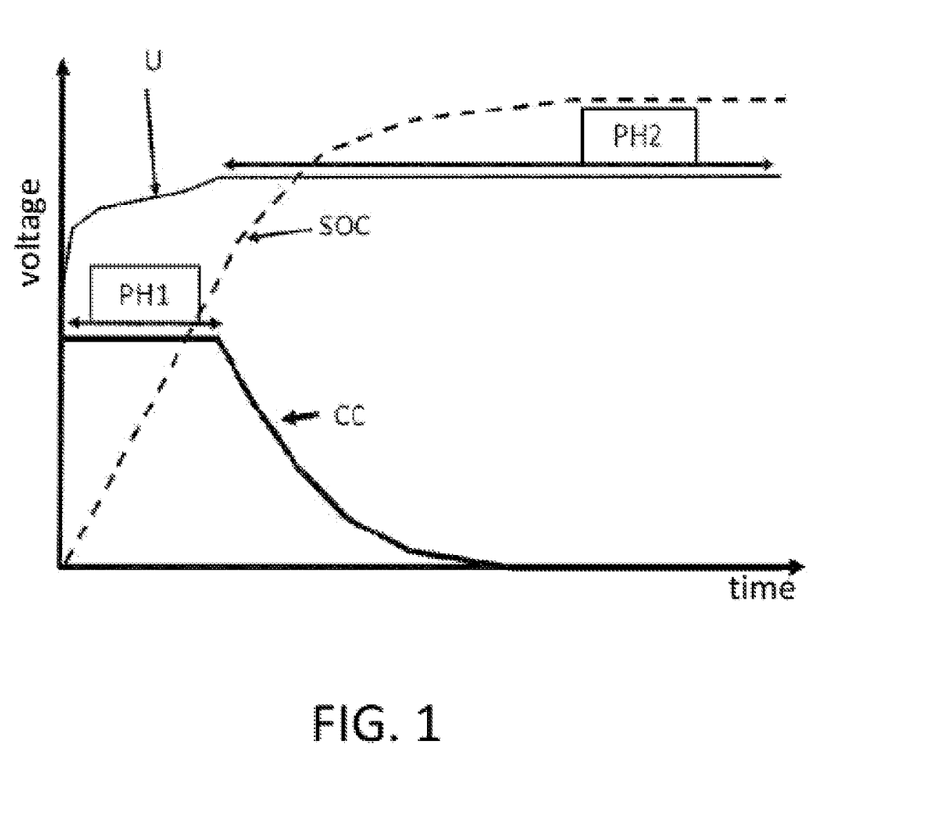
FIG. 1 shows a CC-CV charging protocol according to the state of the art already described in the preamble of the description.

Conventionally, charging protocols are executed in two successive phases designated by the acronym CC-CV for "Constant Current" and "Constant Voltage." In FIG. 1, an example of a conventional CC-CV charging protocol has been shown where the state of charge SOC is represented by the dotted curve. The first phase, referenced PH1, consists in driving a constant charging current (represented by the CC curve) until the cell voltage (represented by the U curve) reaches a maximum voltage recommended by the manufacturer, generally 4.2 V for positive electrode Li-ion cells of the NMC (Nickel Manganese and Cobalt) or NCA (Nickel Cobalt Aluminum) type. Then, these protocols provide for a second phase PH2 at constant voltage equal to the maximum voltage. The function of the maximum voltage is to avoid the undesirable chemical phenomenon of lithium deposition, commonly referred to as "lithium plating." This type of charging protocol requires finding a compromise between charging speed and temperature rise to limit cell aging. Indeed, the first stage PH1 of conventional charging in CC-CV protocol operates at constant current, which contributes to increasing the temperature of the cell. The potentiostatic step of the second phase PH2 significantly increases the global recharge time.

Furthermore, the maximum charging current in CC-CV mode indicated by the cell manufacturer is also determined so as not to generate parasitic reactions that could lead to the degradation of the electrolyte and the deposit of lithium on the negative electrode which can lead to dendrite formation, and therefore to the observation of a short circuit. Beyond the security aspects, this phenomenon causes a drop in the cell's capacity, a degradation of the battery cells, in particular the electrolyte, as well as an increase in its internal resistance. This phenomenon therefore accelerates the aging of the cell, and consequently the cell's performance decreases.

Because of these constraints, it is therefore difficult to increase the charging speed of a cell in the CC-CV protocol and generally leads to significant heating of the cells. For example, for devices conventionally used for motor vehicle electric traction, by implementing this protocol, it is difficult to reach charging speeds greater than 2 C-Rate (charging current value for a full charge in half an hour).

To remedy this drawback, it is possible to opt either for electrode weights that accept higher cycling currents, to the detriment of the capacity of the element, or to use other chemistries, but there again offering less energy density.

In addition, to avoid the lithium plating phenomena, it is known to use alternative charging protocols with pulse control. Pulse control alternates a charging pulse and a zero current relaxation phase, or a polarity inversion phase. These last two phases do not leave sufficient time for the lithium to be deposited in metallic form at the electrode. This protocol therefore makes it possible to increase the life of the cell even when the maximum voltage limit of 4.2 V is exceeded, which can reach up to 4.85 V. The following documents are known from the state of the art describing pulse control protocols.

U.S. Pat. No. 6,707,272 describes a protocol where the pulses are limited by a voltage that depends on the current state of charge of the cell. When the voltage reaches the voltage limit, the protocol drives a relaxation phase.

Pub. No. EP1396061 describes a protocol driving pulses in current control mode. The protocol alternates pulses, chopped at the resonance frequency of the battery, of the order of 100 to 10,000 Hz, and having a duration of between 200 and 1,500 milliseconds, and relaxation and discharge phases of 1,500 milliseconds maximum and 50 milliseconds maximum, respectively.

Pub. No. US20150028819 is also known, describing, in FIG. 4 of this same document, a four-step charging protocol: a constant current pre-charge (CC mode), a constant current main charge (CC mode), pulse charging in current control mode at the constant Isup value (pulse mode) and a constant voltage phase (CV mode).

Pub. No. US20170005497 describes a pulse charging protocol by driving voltage pulses of constant amplitude followed by a relaxation phase making it possible to limit the aging effect. According to this protocol, the duration and amplitude of the charging, discharging and relaxation phases are driven randomly and allow the charging current to be increased without damaging the cell.

WO 2019111226 describes a pulse charging protocol driven in nonlinear voltage control mode aimed at reducing the charging time, where the charging voltage is controlled by keeping the product constant of the time derivative of the intensity by that of the voltage. It will be noted that the recharging ends when the voltage of the cell reaches a maximum value.

SUMMARY

One objective is to overcome the aforementioned problems. To this end, we propose a fast charging protocol for a rechargeable cell making it possible to increase the charging voltage while avoiding an undesirable thermal heating phenomenon, which can limit the charging current. The protocol aims to avoid situations of limitation of the charging current induced by an excessive rise in temperature.

More specifically, in a method for charging an electrochemical cell of a rechargeable battery with charging pulse control, the pulses are driven in voltage control mode in the form of voltage steps of variable amplitude. More specifically, the method comprises calculating the value of each voltage step with respect to the value of the preceding voltage step and as a function of a progression variable representative of the variation in the internal resistance of the cell, for a period ending on the preceding step, with respect to a predetermined tolerated variation threshold, where said variable Var is equal to:

$$\text{Var} = \left(\frac{dR}{dt}\right) - \alpha \qquad \text{[Eq. 1]}$$

Where: Var is the progression variable, d(R)/dt is the variation of the internal resistance of the cell, and a is the predetermined tolerated variation threshold.

According to a variant, when the progression variable is positive, the value of the step is reduced relative to the preceding step, and when the progression variable is negative, the value of the step is increased relative to the preceding step.

According to a variant, the value of each voltage step is equal to the following progression relationship:

$$Ut+1 = Ut\left(1 - \frac{\left(\left(\frac{dR}{dt}\right) - \alpha\right) * \beta}{Rt}\right) \quad \text{[Eq. 2]}$$

Where Ut+1 is the calculated step value, Ut is the value of the preceding step, β is a predetermined parameter and Rt is the value of the internal resistance calculated at the preceding step.

According to a variant, each pulse is formed by a plurality n of voltage steps, where n is an integer coefficient.

According to a variant, the pulses have a fixed predetermined duration.

According to a variant, the method comprises a step of continuously estimating the variation in a thermal power generated by the cell from the triggering of each pulse, and each pulse has a duration dependent on said variation in thermal power relative to a predetermined threshold.

According to a variant, the method comprises the control of a relaxation phase of the cell between each pulse.

According to a variant, the variation of the internal resistance for each voltage step of a pulse is calculated from the variation in potential between the value of the voltage of the preceding step and the estimate of an open-circuit voltage during the relaxation phase preceding said pulse.

According to a variant, the relaxation phases have a duration of approximately two seconds and the voltage steps have a duration of approximately one second, and the coefficient n of pluralities of steps for a pulse is constant for each pulse and is equal to 6.

According to a variant, the method comprises a first charging phase during which the first step is driven at an initial charging value Ut0 calculated according to the following relationship:

$$Ut0 = Uocv + K, \quad \text{[Eq. 3]:}$$

Where Uocv is the open-circuit voltage of the cell at instant t0 of triggering of the charge and K is a predetermined initialization value.

According to a variant, the method comprises the control of a polarity inversion phase between each pulse.

According to a variant, the method comprises a step of continuously measuring the amount of energy charged and the charging is terminated when the state of charge level of the cell reaches a predetermined limit. The amount of energy can be determined by a coulometry method.

A device is also disclosed for charging an electrochemical cell of a rechargeable battery with charging pulse control, the pulses being driven in voltage control mode in the form of voltage steps of variable amplitude, comprising a means for calculating the value of each voltage step, in which said value is calculated with respect to the value of the preceding voltage step and as a function of a progression variable representative of the variation of the internal resistance of the cell, during a period ending at the preceding step, relative to a predetermined tolerated variation threshold, where said variable Var is equal to:

$$\text{Var} = \left(\frac{dR}{dt}\right) - \alpha \quad \text{[Eq. 4]}$$

Where Var is the progression variable, d(R)/dt is the variation of the internal resistance of the cell, and a is the predetermined tolerated variation threshold, and the charging device being configured to implement the method according to one of the preceding embodiments.

A computer program product comprises instructions that, when the program is executed by a control unit of the charging device, lead the charging device to implement one of the embodiments of the charging method with charging pulse control in accordance with one of the preceding embodiments.

The method has the following advantages:

Reduced cell aging during charging due to improved thermal control.

Reduced thermal powers to be extracted from the battery during the charging phase, which has the effect of reducing the cooling capacities of the thermal regulation system of the battery systems as well as their cost and energy consumption. This has a particular advantage for embedded systems.

The improved thermal management consequently allows a reduction in the cost of systems powered electrically by a battery of cells (motor vehicles, portable devices, for example).

Battery charging time is optimized across the entire battery charging plan (0% to 100%). With a CC-CV protocol, the recharging speed is degraded beyond a certain threshold, generally between 50% and 80% of the cell/battery state of charge level.

DESCRIPTION OF THE FIGURES

Further features and advantages of the method will become clearer upon reading the following detailed description of embodiments of the method, which are provided by way of non-limiting examples and are illustrated by the appended drawings, in which.

DETAILED DESCRIPTION

The invention relates to the charging of electrochemical cells, more specifically to rapid charging protocols with charging pulse control. The invention applies to a unitary electrochemical cell and to battery systems comprising a plurality of electrochemical cells that can be addressed individually or by sub-modules. The charging protocol relates to the battery systems of electric motor vehicles or hybrid motor vehicles provided with a charging interface from a power source external to the vehicle. The invention applies to on-board electromobility systems, but also to stationary energy storage systems.

The invention applies to electrochemical energy storage cells, for example of the Lithium-Ion type, of the Lithium polymer, Lithium iron phosphate, Nickel Cadmium or even Nickel-Metal-Hydride type.

The invention further provides a device for charging a cell or an electric battery comprising a plurality of cells, or even a motor vehicle equipped with such a charging device, comprising means for electrically recharging the cell or battery from an external power source. The charging device is configured to implement the charging method according to one of the embodiments described in the following description.

In the case of a motor vehicle with a rechargeable battery, the charging device can be on board the vehicle or can be a charging station outside the vehicle.

More specifically, the charging device is provided with an integrated circuit computer and electronic memories, the computer and the memories being configured to execute the charging method. However, this is not mandatory. Indeed, the computer could be external to the charging device, while being coupled to the device. In this latter case, the external module itself can be arranged in the form of a dedicated computer comprising an optional dedicated program. Therefore, the charging device can be realized in the form of software (or computer) modules, or electronic circuits (or "hardware"), or a combination of electronic circuits and software modules.

Figure 2:
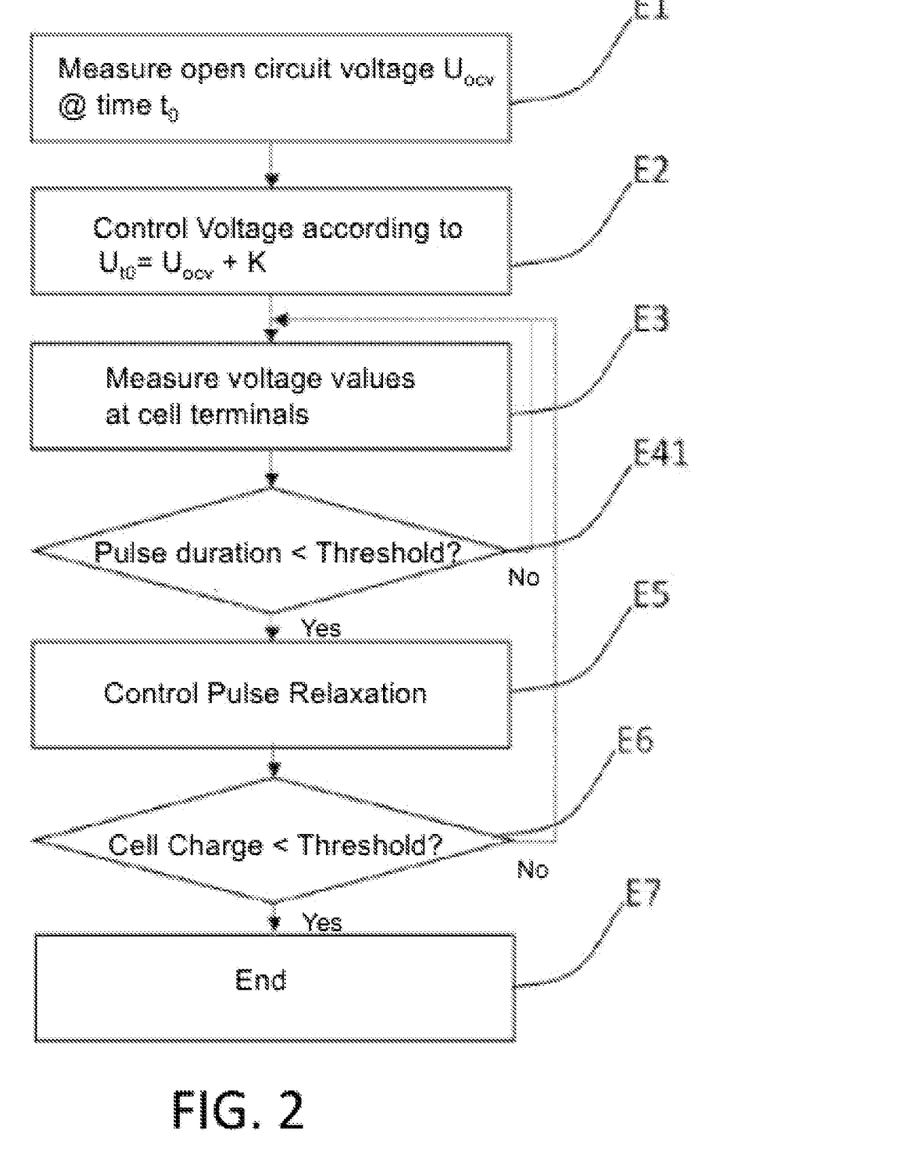
FIG. 2 is a flowchart representing a first algorithm of the method of charging an electrochemical cell with pulse control.

FIG. 2 shows a flowchart illustrating a first algorithm for executing the charging method with charging pulse control. In this algorithm, the duration of the charging pulses is fixed and constant for all pulses. Each pulse is formed of several voltage steps of variable amplitude. The charging pulses alternate with relaxation phases, of predetermined constant duration, if necessary. In this example, the duration of a pulse is approximately six seconds, and the duration of a voltage step, which can also be defined by the terms "no voltage" or "no calculation" of the voltage amplitude, is about one second. The duration of the relaxation phase is about two seconds.

The values of the durations mentioned above are given by way of example and may vary. Moreover, these values can have a precision of the order of a few milliseconds, or even ten milliseconds during the execution of the charging protocol.

The term "relaxation phase" means a phase during which the cell is not traversed by a charging or discharging current. The cell voltage then stabilizes at an open-circuit voltage (OCV) value after a certain relaxation time, also referred to as "drop-out voltage."

Figure 3:
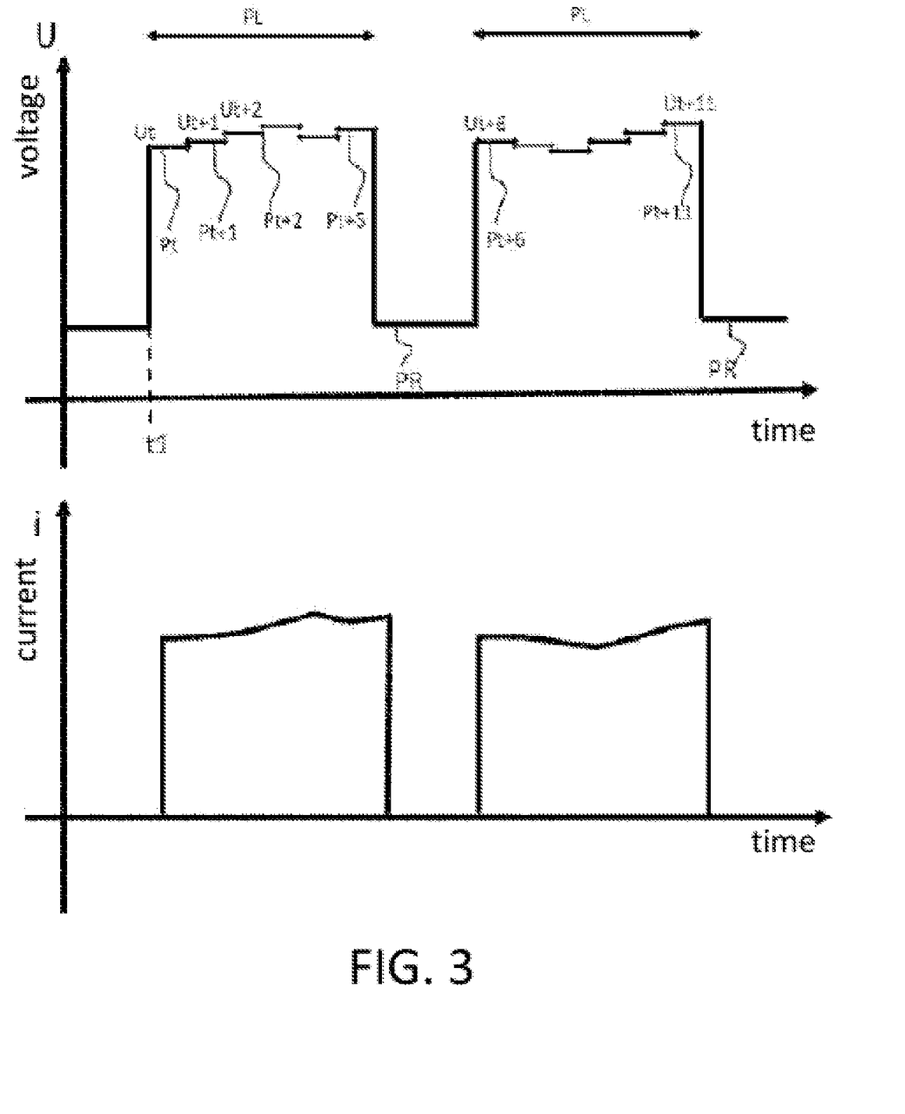
FIG. 3 schematically shows a driving sequence of the charging voltage signal and the charging current of an electrochemical cell in accordance with the first algorithm of the charging method.

Reference is now made to FIGS. 2 and 3 in parallel to describe the first algorithm. The method is configured to drive voltage steps defining a calculation step temporally, where the voltage value is calculated (updated) at each step/pitch.

At a first initial phase, the method comprises a step E1 of measuring the open-circuit voltage Uocv of the cell at an instant t0 before the electric charge is triggered. At this instant t0, the cell or battery is not traversed by any current. The function of the Uocv value is to initialize the value of the first step(s).

At a second phase, from instant t0, the method comprises a second step E2 of controlling a voltage Ut0 according to the following relationship:

$$Ut0 = Uocv + K,\qquad[\text{Eq. 5}]$$

Where Uocv is the open-circuit voltage at instant t0 and K is a predetermined initialization value stored in the memory of the computer expressed in Volts. K is for example equal to 0.4 V or 0.5 V or a value between 0.4 V and 0.5 V. The Ut0 value is independent of the initial state of charge level of the cell and is therefore applied regardless of the state of charge of the cell.

The higher the value of K, the higher the cell charging rate. The charge initialization value K is set according to the desired charge duration and the accepted ageing.

During step E2, the method alternately drives voltage control mode pulses from voltage steps at the value Ut0 and from the relaxation phases of the cell. The voltage steps have a duration of about one second and the pulses have a duration of about six seconds. The relaxation phases have a duration of two seconds, for example. Step E2 is controlled for a predetermined duration (time delay), much less than the duration of the complete charging of the cell, for example a few tens of seconds, or even a few hundreds of seconds. The purpose of this phase is to initialize the charging method and the parameters used to calculate the variable amplitudes of the voltage steps in the following phase, in particular the value of the internal resistance of the cell.

More precisely, for each step, the method executes a step for calculating the internal resistance of the cell. The internal resistance is calculated by measuring the difference between the voltage of each step and an open-circuit voltage value Uocv, and by dividing this difference by the value of the current passing through the cell during each step. The open-circuit voltage value is the value measured during the last relaxation phase before said step, or the first value Uocv at instant t0.

For the purposes of carrying out the method, the charging device to this end comprises means for measuring (sensors), at each instant, the temperature of the cell, the current, the voltage during the driving of a voltage, as well as means for estimating the open-circuit voltage updated at each relaxation phase, either by measurement or by calculation model. A computer and memories are provided to store and update the values at any instant.

As a variant, step E2 is optionally a constant voltage or constant current charging phase that is not of the pulse type. In this variant, step E2 nevertheless preferably comprises at least one relaxation phase allowing the determination of an updated value of the open-circuit voltage of the cell in order to calculate the internal resistance necessary to determine the first variable amplitude step.

Once the initialization is complete (for example after the time delay), the method drives the load by pulse control in voltage control mode where each step is determined from the voltage value of the preceding step and a progression variable.

More precisely, at a step E3, illustrated by the graphs of FIG. 3, from an instant designated by reference t1, the method comprises, for each voltage step (Pt, Pt+1, Pt+2, . . . , Pt+6, . . . , Pt+11) a step for measuring voltage values (Ut, Ut+1, Ut+2, . . . , Ut+6, . . . , Ut+11) driven at the terminals of the cell under a charge current I, represented by the lower graph, for measuring the internal resistance of the cell Rt and for calculating the variation in internal resistance d(R)/dt. These measurements are used to calculate the voltage amplitude value of the next step. These measurements and calculations are carried out at each step.

As can be seen in FIG. 3, two successive steps immediately follow each other when a pulse is controlled, for example Pt and Pt+1, or a relaxation phase PR may be inserted between them, for example, between Pt+5 and Pt+6. Identically to step E2, for each step Pt, the internal resistance Rt is calculated by measuring the potential difference between the voltage of said step Pt and an open-circuit voltage value Uocv, and by dividing this difference by the value of the current passing through the cell during said step Pt.

The method comprises calculating the value of each voltage step Ut+1 with respect to the value of the respective preceding voltage step Ut and as a function of a progression variable Var, where Var is representative of the temporal variation of the internal resistance d(R)/dt during a period ending at the preceding step, preferably the period between the two successive steps, and a predetermined tolerated variation threshold a.

The temporal variation of the internal resistance d(R)/dt is obtained by a temporal derivative calculation of the internal resistance value between the two successive steps.

The progression variable Var is equal to the following relationship:

$$\text{Var} = \left(\frac{dR}{dt}\right) - \alpha \qquad [\text{Eq. 6}]$$

The tolerated variation a is a predetermined factor stored in the memory of the computer of the charging device and defines a tolerated increase in the internal resistance, i.e. an increase in the temperature tolerated for the cell.

The function of the progression variable Var is to modulate the charge current by voltage control mode as follows:
When the progression variable Var is positive, that is to say, d(R)/dt is greater than α, the value of the step Ut+1 is reduced in relation to the step Ut,
When the progression variable Var is negative, that is to say, d(R)/dt is less than α, the value of the step Ut+1 is increased with respect to the step Ut.

The voltage control mode based on a calculation of the variation of the internal resistance has the effect of improving the reactivity of the control loop of the charge voltage and makes it possible to reduce the duration of a calculation pitch of the voltage step, with regard to a control solution by monitoring the temperature or a solution based on monitoring a voltage threshold. In these two cases, the voltage and current control loops bring the battery into a critical situation causing preventive current limitation measures.

Since the internal resistance of a cell is dependent on the temperature of the cell, by controlling the value of the voltage steps according to the derivative of the internal resistance, the charge voltages are controlled while ensuring effective continuous thermal control, especially for sudden rises in temperature. In the event of a sudden rise in cell temperature, the method automatically controls a reduction in the charging voltage. This has the advantage of not entering into a situation of thermal saturation and current limitation.

As can be seen in FIG. 3, the charging method alternates a voltage control mode pulse and a relaxation phase PR. Each pulse is made up of six steps, where the value of each step is recalculated according to the progression variable Var. On the lower graph, the charge current I passing through the cell and imposed by the voltage steps is shown.

This voltage control mode based on the progression value Var makes it possible to finely control the charge current according to a tolerated temperature variation criterion. This makes it possible to reduce the temperature increase of the cell during charging, and therefore aging. In addition, this voltage control mode, associated with a voltage pulse protocol, allows voltage driving at a value that is greater than the maximum voltage limit generally recommended by the manufacturer of the cell in CC-CV protocol. Indeed, it is possible to reach pulses of 4.8 Volts, higher than the limit of 4.2 Volts for a Lithium-ion cell without producing Lithium plating on the electrodes. These voltage levels make it possible to increase the charge current, and therefore the charging speed while having effective temperature control of the cell.

Preferably, the value of each voltage step Ut+1 is calculated according to the preceding step Ut and the progression variable Var, according to the following progression relationship:

$$Ut+1 = Ut\left(1 - \frac{\left(\left(\frac{dR}{dt}\right) - \alpha\right) * \beta}{Rt}\right) \qquad [\text{Eq. 7}]$$

Where a is the predetermined tolerated variation threshold, β is a predetermined parameter and Rt is the value of the internal resistance calculated at the preceding step Pt.

In this formula, β is the factor that makes it possible to modulate the action of the progression variable Var, and is determined experimentally and equal for example to 0.1 s.

The variation threshold a is a characteristic intrinsic to the type of cell and can be established from supplier data, taking into account the open-circuit voltage for an initial state of charge at t0 of 0%, for example, and the voltage at the terminals of the rated capacity cell under load with a final state of charge of 100%. The value a can be determined from the previous formula (Eq. 7), which is considered as a geometric sequence and by making the postulate of neglecting the variation of the internal resistance, i.e. by considering that d(R)/dt=0.

We therefore deduce the following relationship for the calculation of a:

$$Ut+1 = Ut\left(1 + \frac{(\alpha) * \beta}{R}\right) \qquad [\text{Eq. 8}]$$

And so:

$$\alpha = \frac{R}{\beta}\left(t_{final}\sqrt{\frac{U_{t_{final}}}{U_{t_o}}} - 1\right) \qquad [\text{Eq. 9}]$$

By way of example, experimentally, a value of a has been found equal to 72.3 μOhm·s-1 for a cell incorporating an NMC cathode. The charging rate depends on a through the charging time tfinal: the shorter the latter, the greater α. To determine the value of R, an average between the resistance at low level of charge (around 20%) and the resistance at high level of charge (close to 80%) is calculated for the type of cell and corresponds to an intrinsic characteristic of the cell. Once these two resistances have been found, α is calculated, from a new state of a cell, for a cell format and an electrochemical composition, and is configured in the memory of the computer of the charging device for the execution of the charging method.

Then, in a step E41, the method comprises a step of verifying the duration of the pulse. If the duration is greater than a predetermined threshold, here for example 5 seconds, the method controls a relaxation phase at a step E5. Otherwise, if the pulse duration is less than the threshold, then the method returns to step E3 to drive another voltage step forming part of the same pulse.

The verification E41 of the duration of the pulse can be performed alternatively by checking the number of voltage steps controlled during step E3. For example, if it is detected that the number of steps forming a pulse is greater than a predetermined whole number, for example 5, the method drives a relaxation phase. In the first embodiment, the duration of a pulse is fixed for all pulses. Another alternative to step E41, corresponding to the second embodiment, will be described in FIG. 5.

At step E5, the method controls the relaxation phase PR, for example lasting two seconds.

Then, the method comprises a step E6 of verifying the amount of energy charged into the cell during the charging protocol. In step E6, the amount of energy charged is calculated by coulometry, that is to say by the current measurement done by sensor from the charging start instant at t0, and a complete calculation of the current, and the amount charged is compared with a maximum charge limit, for example the nominal capacity of the cell Qnom, or a predetermined maximum charge limit in the case of a battery.

When the charged capacity reaches the maximum limit, at a final step E7, the charging method executes the cell/battery charging stop command.

Otherwise, the method again drives a charging pulse in voltage control mode according to step E3. The pulse charging protocol, alternating charging pulses in voltage control mode and relaxation phase until the charged capacity is equal to the maximum limit.

In the case of FIG. 3, it will be noted that a pulse is formed by a plurality n of voltage steps, where n is an integer coefficient, here n=6. Having several steps n during the driving of a pulse improves the reactivity of the charging protocol with respect to the variation of the internal resistance. The charging device has better temperature control compared to a system where the voltage amplitude of a pulse is constant.

Figure 4:
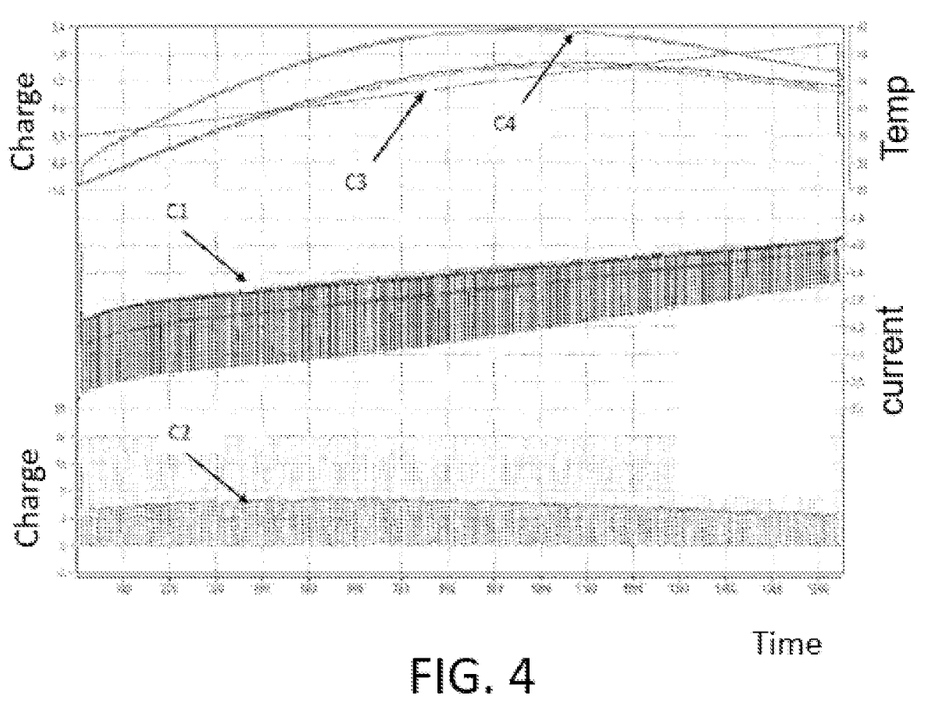
FIG. 4 is a graph showing full charging of a battery cell when performing the charging method according to the first algorithm.

FIG. 4 illustrates complete charging of a cell (0%→100%) during the application of the first algorithm of the pulse charging method. The voltage pulses are represented by the curve C1, the resulting current is represented by the lower curve C2, the evolution of the state of charge from 0 to 100% is represented by the straight line C3 and the temperature of the cell is represented by curve C4.

It is observed that the voltage increases at the end of charging up to 4.7 Volts and relaxes around 4.2 Volts (open-circuit voltage with a state of charge of 100%). The cell is charged in 1,700 seconds and causes a maximum temperature rise of 20° C. The end of charge criterion corresponds to reaching the maximum capacity of the battery, estimated by the coulometric method.

Finally, for the purposes of executing the charging method, the cell charging device comprises means for measuring the electrical parameters of the cell (voltage, current in particular), as well as calculation means specifically configured to continuously calculate internal resistance values of the cell, values of variation of the internal resistance between each voltage step, step values as a function of the preceding step and of the variation of internal resistance, means for controlling the charging pulses in the form of voltage steps driven in voltage control mode alternately with phases of relaxation, or possibly of polarity inversion.

Figure 5:
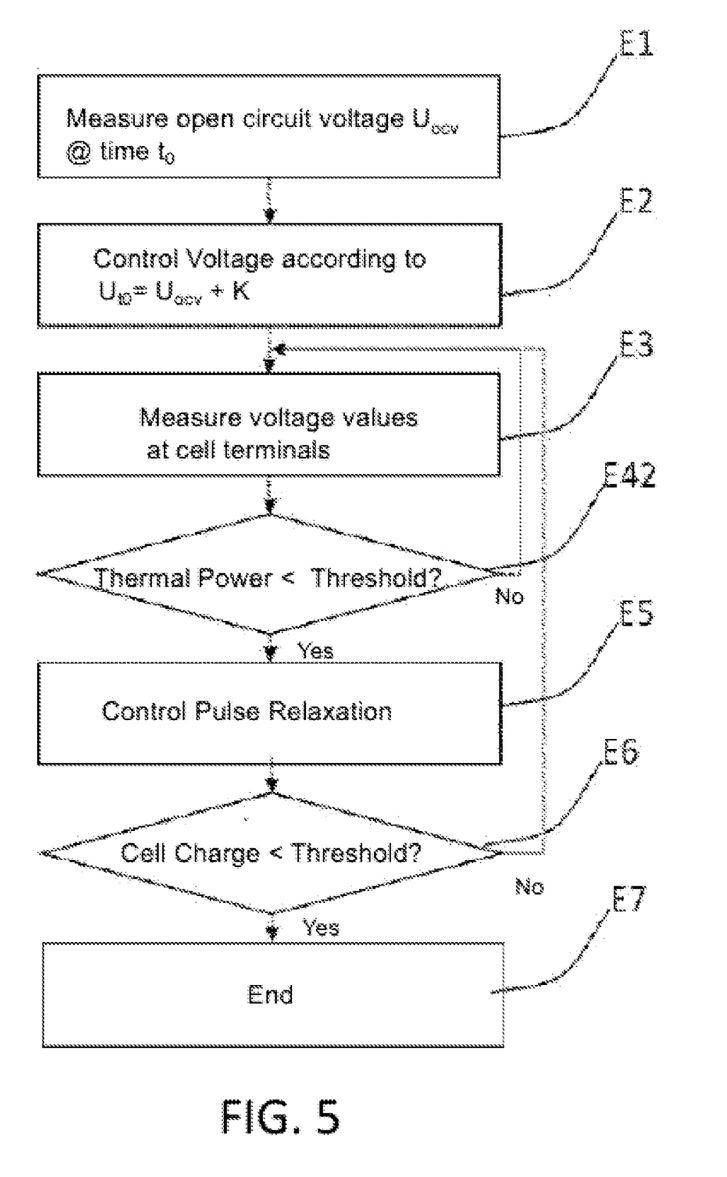
FIG. 5 is a flowchart representing a second algorithm of the method of charging an electrochemical cell with pulse control.

FIG. 5 shows a flowchart illustrating the second algorithm for executing the pulse control charging method. In this algorithm, the duration of the charging pulses depends on the variation in thermal power generated by the cell from the start time of the pulse. Like the first algorithm, described in FIG. 2, each pulse is formed by several voltage steps of variable amplitude calculated according to the preceding step and the progression variable calculated according to the variation of the internal resistance. The charging pulses alternate with relaxation phases, of predetermined constant duration, optionally.

The second algorithm differs from the first algorithm in that a pulse is generated, i.e., without inserting a relaxation phase, as long as the thermal variation does not exceed a predetermined thermal power threshold. Identically to the first algorithm, the duration of a voltage step is approximately one second and the duration of the relaxation phase is approximately two seconds. steps E1, E2, E3, E5, E6, E7 are therefore identical to the corresponding steps of the first algorithm in FIG. 2.

Thus, step E42 comprises verifying that the thermal power generated by the cell since the start of driving a pulse remains below a predetermined threshold. At step E42, the method therefore comprises a step of continuously estimating the variation in a thermal power generated by the cell from the triggering of each pulse, and each pulse has a duration dependent on said variation in thermal power relative to said predetermined threshold. When the thermal power reaches the threshold, the method controls a relaxation phase in step E5. For example, the power variation threshold has a value of 0.02 W.

The thermal power is calculated by multiplying the intensity that passes through the cell by the voltage difference between the closed-circuit voltage and the open-circuit voltage, during the relaxation phase preceding the pulse. It is possible to control the thermal power by measurement from a sensor. However, the temperature measurement can present a latency time, which is not optimal for driving the pulses.

The duration of the pulses is therefore variable for the second algorithm. This mode of triggering a relaxation phase has the advantage of improving the thermal control of the cell during charging, in particular to avoid the effects of lithium plating. It also makes it possible to continue applying a charging voltage, as long as the monitored thermal conditions allow it. Moreover, in addition to calculating the voltage of each step, which can also increase if the thermal conditions allow it, the method significantly increases the charging speed of a cell/battery. Just like for the first algorithm, the driving of the voltages of each step (according to the preceding step and the variation of the internal resistance) and the pulsed protocol makes it possible to increase the charging voltage beyond the limit voltage recommended by the manufacturer.

Figure 6A:
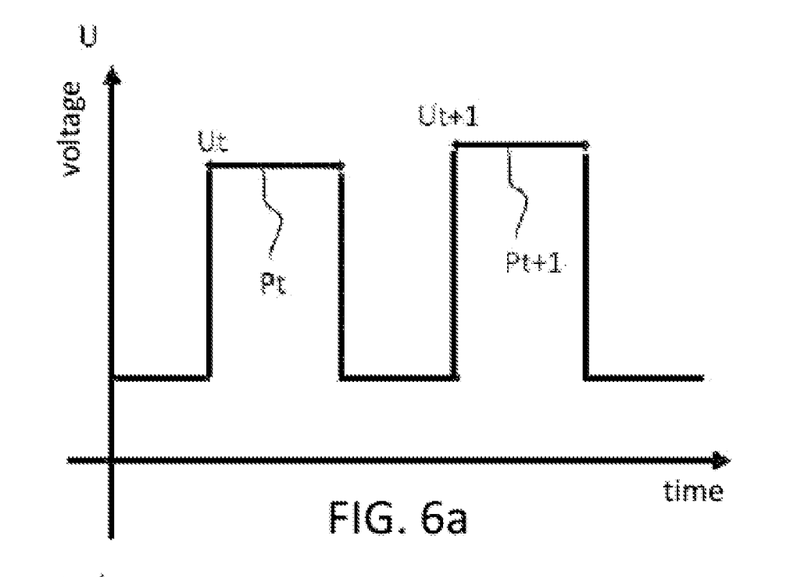
FIG. 6a shows a first pulse shape variant of the charging protocol that can be implemented by the first algorithm.
Figure 6B:
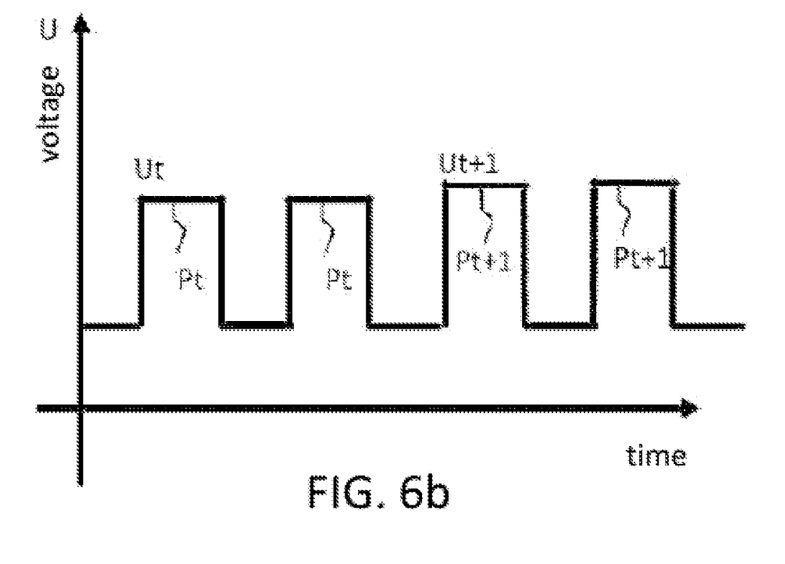
FIG. 6b shows a second pulse shape variant of the charging protocol where the duration of a step is greater than the pulse duration.
Figure 6C:
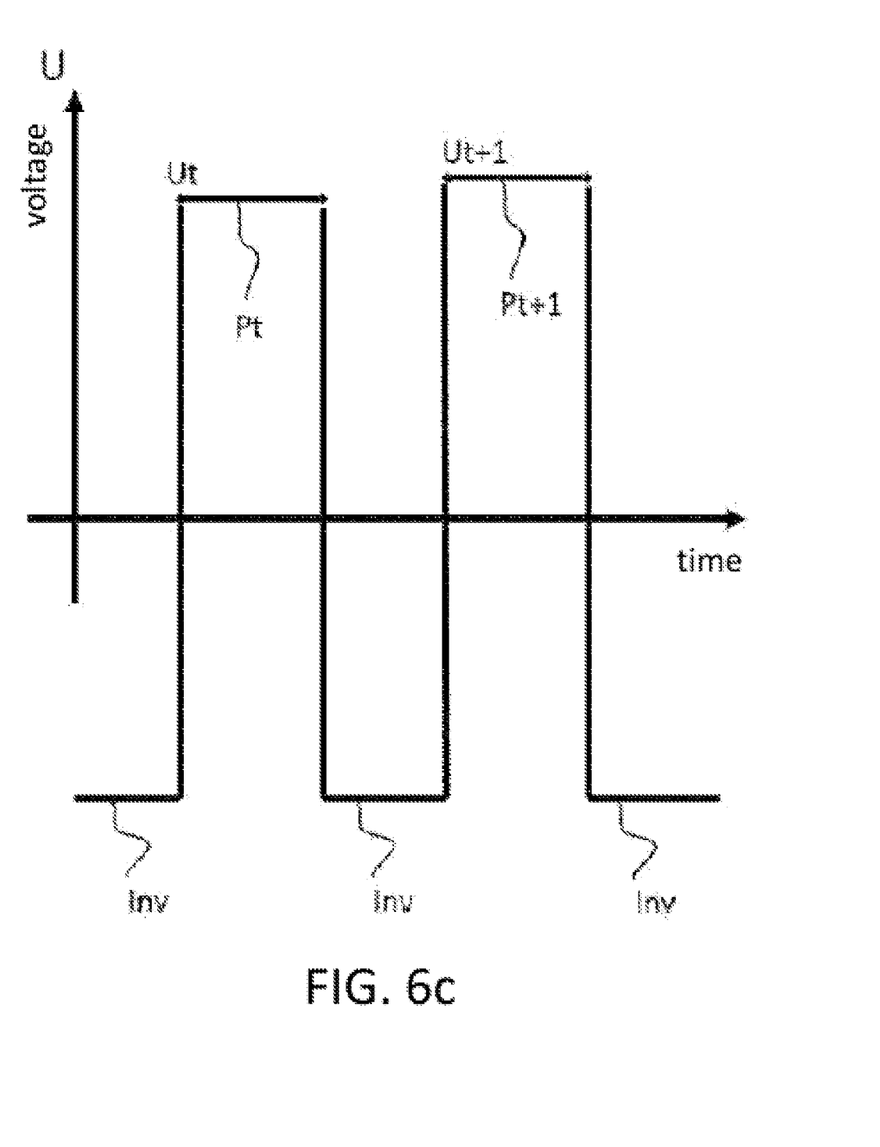
FIG. 6c shows a third variant of the pulse shape of the charging protocol where the relaxation phases are replaced by polarity inversions.

FIGS. 6a, 6b and 6c show variants of the voltage control mode pulse shapes that can be driven by the method. In FIG. 6a, one can see that the steps Pt, Pt+1, of variable voltage Ut, Ut+1 in accordance with the method, can be of a duration equal to one pulse. This pulse shape can be driven by means of the first algorithm.

It is also possible for the duration of a step to be greater than the duration of a pulse. For example, as shown in FIG. 6b, the calculation of the voltages is carried out according to a pitch that is equal to a multiple of the duration of a pulse and of a relaxation. This pulse shape can be driven by means of the first algorithm.

As illustrated by FIG. 6c, it is envisaged that the relaxation phase can be replaced by an inversion phase of polarity inv. An alternative method of estimating the open-circuit voltage of the cell would be set up from the instantaneous measurable parameters of the cell (for example, state of charge) and pre-established estimation models of the cell for the calculation of the progression variable. This pulse shape can be driven by means of the first algorithm and the second algorithm.

The invention claimed is:

1. A method for charging an electrochemical cell of a rechargeable battery with charging pulse control, the method comprising:
   applying, via a controller, a pulsed voltage to the electrochemical cell, the pulsed voltage comprising a voltage control pulse mode followed by a relaxation phase, wherein the voltage control pulse mode comprises a plurality of voltage steps (Pt) of variable amplitude,
   wherein the value (Ut+1) of each voltage step (Pt+1) is determined as a function of the value (Ut) of the preceding voltage step (Pt) and as a function of a progression variable (Var) representative of a variation of an internal resistance of the cell (d(R)/dt), during a period ending at the preceding step (Pt), relative to a predetermined tolerated variation threshold (α), where said variable Var is equal to:

$$\text{Var} = \left(\frac{dR}{dt}\right) - \alpha$$

Where: Var is the progression variable, d(R)/dt is the variation of the internal resistance of the cell, and a is the predetermined tolerated variation threshold;
   monitoring an energy level of the electrochemical cell; and
   continuing to apply said pulsed voltage until said energy level reaches a maximum charge limit.

2. The method according to claim 1, wherein when the progression variable (Var) is positive, the value (Ut+1) of the step (Pt+1) is reduced relative to the preceding step (Pt) and in that when the progression variable (Var) is negative, the value (Ut+1) of the step (Pt+1) is increased relative to the preceding step (Pt).

3. The method according to claim 2, wherein the value of each voltage step (Ut+1) is equal to the following progression relationship:

$$Ut+1 = Ut\left(1 - \frac{\left(\left(\frac{dR}{dt}\right) - \alpha\right) * \beta}{Rt}\right)$$

Where Ut+1 is the calculated step value, Ut is the value of the preceding step, β is a predetermined parameter and Rt is the value of the internal resistance calculated at the preceding step.

4. The method according to claim 1, wherein each pulse is formed by a plurality n of voltage steps (Pt), where n is an integer coefficient.

5. The method according to claim 1, wherein the pulses have a fixed predetermined duration.

6. The method according to claim 1, wherein the method comprises a step of continuously estimating the variation in a thermal power generated by the cell from the triggering of each pulse, and in that each pulse has a duration dependent on said variation in thermal power relative to a predetermined threshold.

7. The method according to claim 1, wherein the method comprises controlling the relaxation phase of the cell between each pulse.

8. The method according to claim 7, wherein the variation of the internal resistance (d(R)/dt) for each voltage step (Ut+1) of a pulse is calculated from the variation in potential between the value of the voltage (Ut) of the preceding step (Pt) and the estimate of an open-circuit voltage (Uocv) during the relaxation phase (PR) preceding said pulse.

9. The method according to claim 1, wherein the method comprises a first charging phase during which the first step is driven at an initial charging value Ut0 calculated according to the following relationship:

$$Ut0 == Uocv + K,$$

Where Uocv is the open-circuit voltage of the cell at instant t0 of triggering of the charge and K is a predetermined initialization value K.

10. A device for charging an electrochemical cell of a rechargeable battery with charging pulse control,
   the charging device comprising:
      sensors for measuring one or more of a temperature, current, and voltage of the electrochemical cell,
      calculation means configured to calculate internal resistance values of the cell, values of variation of the internal resistance between each voltage step (Pt), step values as a function of the preceding step and of the variation of internal resistance, and
      means for controlling the charging pulses in the form of voltage steps driven in voltage control mode alternately with phases of relaxation, or of polarity inversion; and
   wherein the device is configured to implement the method according to claim 1.

11. A method of charging an electrochemical cell of a rechargeable battery using a charging device; the charging device comprising:
   sensors for measuring one or more of a temperature, current, and voltage of the electrochemical cell,
   means for controlling the charging pulses in the form of voltage steps driven in a voltage control mode alternately with phases of relaxation or of polarity inversion; and
   calculation means configured to calculate internal resistance values of the cell, values of variation of the internal resistance between voltage steps, step values as a function of a preceding step and of the variation of internal resistance;
wherein the method comprises:
   (a) measuring, via the sensors, voltage values of the electrochemical cell at terminals of the cell;

(b) applying, via a controller, a pulsed voltage to the electrochemical cell, the pulsed voltage comprising a voltage control pulse mode followed by a relaxation phase, wherein the voltage control pulse mode comprises a plurality of voltage steps (Pt) of varying amplitude, each voltage step being of a determined duration;

(c) monitoring a charge status of said electrochemical cell and carrying out steps (a) and (b) as until said charge status reaches a maximum limit;

wherein, the step of applying the pulsed voltage to the electrochemical cell comprises electronically calculating a value (Ut+1) of each voltage step P(t+1), wherein said value (Ut+1) is calculated as a function of the value (Ut) of the preceding voltage step (Pt) and as a function of a progression variable (Var) representative of the variation of the internal resistance of the cell, during a period ending at the preceding step (Pt), relative to a predetermined tolerated variation threshold, where said variable Var is equal to:

$$Var = \left(\frac{dR}{dt}\right) - \alpha$$

where Var is the progression variable, d(R)/dt is the variation of the internal resistance of the cell, and $\alpha$ is a predetermined tolerated variation threshold.

12. The method according to claim 11 wherein the value (Ut+1) is calculated according to the following formula:

$$Ut+1 = Ut\left(1 - \frac{\left(\left(\frac{dR}{dt}\right) - \alpha\right) * \beta}{Rt}\right)$$

where $\beta$ is a predetermined parameter and Rt is a value of the internal resistance calculated at a preceding step Pt.

13. The method according to claim 11 including measuring, via said sensor, an open-circuit voltage ($U_{ocv}$) of the cell prior to charging and calculating an initial voltage ($U_{r0}$) wherein $U_{r0}=U_{ocv}+K$, wherein K is a constant.

14. The method according to claim 11 wherein each voltage step has a fixed duration $D_s$, and wherein the pulse has a duration of $nD_s$, where n is the number of steps and $D_s$ is the duration of each step.

15. The method according to claim 14 wherein n=6 and the pulse duration is approximately 6 seconds.

16. The method according to claim 11 comprising a step of estimating a thermal power generated by the cell as a function of a closed-circuit voltage and an open circuit voltage of the cell; wherein the voltage pulse is driven while the thermal power remains below a predetermined threshold.

17. The method according to claim 16 wherein each voltage step has a duration of about one (1) second.

18. The method according to claim 11 wherein the relaxation phase is approximately two (2) seconds.

* * * * *